United States Patent
Bemis et al.

(10) Patent No.: US 11,644,478 B2
(45) Date of Patent: May 9, 2023

(54) AUTOMATED OPTIMIZATION OF AFM LIGHT SOURCE POSITIONING

(71) Applicant: Oxford Instruments Asylum Research, Inc., Goleta, CA (US)

(72) Inventors: Jason Bemis, Penfield, NY (US); David Aue, Kensington, CA (US); Aleksander Labuda, Santa Barbara, CA (US)

(73) Assignee: Oxford Instruments Asylum Research, Inc., Goleta, CA (US)

( * ) Notice: Subject to any disclaimer, the term of this patent is extended or adjusted under 35 U.S.C. 154(b) by 0 days.

(21) Appl. No.: 17/591,402

(22) Filed: Feb. 2, 2022

(65) Prior Publication Data
US 2022/0244289 A1    Aug. 4, 2022

Related U.S. Application Data

(60) Provisional application No. 63/145,314, filed on Feb. 3, 2021.

(51) Int. Cl.
*G01Q 20/02* (2010.01)
*G01Q 10/06* (2010.01)
*G01Q 30/02* (2010.01)
*G01Q 30/04* (2010.01)
*G01Q 60/42* (2010.01)

(52) U.S. Cl.
CPC .......... *G01Q 20/02* (2013.01); *G01Q 10/065* (2013.01); *G01Q 30/025* (2013.01); *G01Q 30/04* (2013.01); *G01Q 60/42* (2013.01)

(58) Field of Classification Search
CPC .... G01Q 20/02; G01Q 10/065; G01Q 30/025; G01Q 60/42
See application file for complete search history.

(56) References Cited

U.S. PATENT DOCUMENTS

| 8,887,311 | B1 | 11/2014 | Kirishima |
| 2002/0195553 | A1 | 12/2002 | Schaffer et al. |

(Continued)

FOREIGN PATENT DOCUMENTS

| WO | 2013114099 | 8/2013 |
| WO | 2018109803 | 6/2018 |

OTHER PUBLICATIONS

Extended Search Report from related European Patent Application No. 22154852.2, dated Jun. 28, 2022, 51 pages.

(Continued)

*Primary Examiner* — Nicole M Ippolito
(74) *Attorney, Agent, or Firm* — Brooks, Cameron & Huebsch, PLLC

(57) ABSTRACT

An atomic force microscope is provided having a controller configured to store one or more positional parameters output by a sensor assembly when a light spot is located at a first preset position on the surface of the cantilever. The controller is further configured to operate an actuator assembly so as to induce movement of the spot away from the first preset position, to detect said movement of the first spot based on a change in the one or more positional parameters output by the sensor assembly, and to operate an optical assembly in response to the detected movement of the first spot to return the first spot to the first preset position.

12 Claims, 6 Drawing Sheets

(56) References Cited

U.S. PATENT DOCUMENTS

| | | | |
|---|---|---|---|
| 2006/0162455 A1* | 7/2006 | Kawakatsu | B82Y 35/00 |
| | | | 73/579 |
| 2008/0223119 A1 | 9/2008 | Phan et al. | |
| 2017/0059609 A1* | 3/2017 | Watanabe | G01Q 20/02 |
| 2018/0172726 A1* | 6/2018 | Nagai | G01Q 30/04 |
| 2021/0302465 A1* | 9/2021 | Yamasaki | G01Q 20/02 |

OTHER PUBLICATIONS

Nievergelt, et al., "Photothermal Off-Resonance Tapping for Rapid and Gentle Atomic Force Imaging of Live Cells", International Journal of Medical Sciences, 2018, 11 pages.

Nievergelt, et al., "High-speed photothermal off-resonance atomic force microscopy reveals assembly routes of centriolar scaffold protein SAS-6", Nature Nanotechnology, vol. 13, Aug. 2018, 7 pages.

"Nanosurf introduces a cutting-edge tip-scanning atomic force microscope", https://www.nanowerk.com/nanotechnology-news2/newsid=56833.php, retrieved Feb. 1, 2022, 2 pages.

\* cited by examiner

AUTOMATED OPTIMIZATION OF AFM LIGHT SOURCE POSITIONING

PATENT REFERENCES

U.S. Pat. No. 9,383,386
U.S. Pat. No. 10,054,612
U.S. Pat. No. 10,564,181

FIELD OF THE INVENTION

The invention relates to the operation of an atomic force microscope.

BACKGROUND OF THE INVENTION

Atomic Force Microscopy (AFM), Scanning Tunneling Microscopy (STM), Near field Scanning Optical Microscopy (NSOM) and related SPM photonic techniques, magnetic field microscopy, electric force microscopy, scanning kelvin force microscopy, high-resolution profilometers (including mechanical stylus profilometers), surface modification instruments, nanomachining systems, nanoindenters, chemical/biological sensing probes, instruments for electrical measurements and micro-actuated devices and any other methods adaptable and suitable to image, measure and/or modify topography or other properties on a small length scale. These technologies are sometimes collectively referred to as Scanning Probe Microscopy (SPM). Generally, SPM technologies allow one to "see" atomic-scale and larger features on or in surfaces. The systems and techniques described herein may be realized in such other scanning probe devices. Specifically, the invention is directed to optimizing and automatically optimizing and controlling techniques and systems in the very broad field of SPM technology.

SPMs are devices which obtain sample information while scanning (e.g., rastering) a sharp tip on the end of a probe relative to the surface of the sample.

The information and characteristics are obtained by detecting small changes, for example, in the deflection or oscillation of the probe (e.g., by detecting changes in amplitude, deflection, phase, frequency, etc) and using feedback to return the system to a reference state. By scanning the tip relative to the sample, maps of these properties can be obtained. These maps can span 1-3 spatial dimensions and can be made a function of other control parameters such as time, SPM operational parameters, temperature, humidity, chemistry, light, magnetic and electric fields and numerous other parameters known to practitioners.

Specifically AFMs rely on the inter-atomic interactions, such as van der Waals forces, contact elastic and inelastic and many other forces that arise between the atoms in the structure of the tip and the atoms at the surface being imaged.

As the tip moves relative to the surface, it is attracted and repelled, depending on the nature of the interactions and the relative position. In its simplest form, the cantilever beam is deflected in response to these forces. This deflection can then be measured to characterize the structure of the surface being scanned.

The AFM can work with the tip touching the sample (contact mode), or the tip can tap across the surface (tapping mode) or made to not touch the surface at all (non-contact mode). Generally, off-resonance measurements are easier to interpret but are subject to higher noise and less sensitivity while on-resonance measurements are more sensitive but come at the cost of being more difficult to interpret quantitatively.

Changes in the deflection or oscillation of the probe are typically detected by an optical lever arrangement whereby an incident light beam is directed onto the side of the probe opposite the tip and a reflected beam from the probe illuminates a position sensitive detector ("PSD"). As the deflection or oscillation of the probe changes, the position of the reflected spot on the PSD also changes, causing a change in the output from the PSD. Changes in the deflection or oscillation of the probe are typically made to trigger a change in the vertical position of the base of the probe relative to the sample (referred to herein as a change in the Z position, where Z is generally orthogonal to the X/Y plane defined by the sample), in order maintain the deflection or oscillation at a constant pre-set value. It is this feedback that is typically used to generate a SPM or AFM image.

The optical lever arrangement discussed above measures probe motion indirectly by measuring the angle of reflection of a light beam from the probe to the PSD. A few SPMs and AFMs, particularly earlier manifestations, have measured the motion of the probe directly through the use of an interferometric detection scheme. This method of measuring the motion of the probe gives the user a direct measurement of probe displacement and/or velocity.

Observable for the AFM include the cantilever deflection, amplitudes and phases, resonant frequencies, quality factors and other parameters that are related to the cantilever dynamics. The deflection can be measured over a period of time and then processed to create other observables such as an amplitude or power spectrum. Further parameters can be extracted from these spectra such as the noise floor and some of the parameters discussed above such as the resonant frequencies, quality factors and spring constants.

In addition, AFMs and some related techniques are capable of measuring forces accurately at the sub-piconewton to micronewton range. One fundamental measurement mode for doing this is known as a "force-distance curve" or "force curve", where the position of the probe is ramped towards and then away from the surface while various cantilever properties such as the degree of bending (the deflection) is monitored.

The mechanical resonance of the cantilever probe can be used to increase the sensitivity and lower the noise for various measurements.

An ongoing trend for these instruments has been steadily increasing resolution and speed. This typically requires the measurement of decreasingly smaller forces free of noise artifacts, the old generations of these devices are made obsolete. A demand for faster results, requiring decreasingly smaller cantilevers, only reinforces this obsolescence. The preferable approach is a new device that addresses the central issue of measuring small forces with minimal noise, while providing an array of modules optimizing the performance of the device when using small cantilevers or when doing specialized applications such as optical techniques for biology, optical techniques for photochemical, photothermal, photovoltaic and other light induced changes to the cantilever or sample, nanoindentation and electrochemistry.

In addition, the scanning motion can range from a simple raster pattern to much more complicated trajectories.

Actuators are commonly used in SPMs and AFMs, for example to raster the probe or to change the position of the base of the robe relative to the sample surface. The purpose of actuators is to provide relative movement between different parts of the SPM or AFM: for example, between the tip of the probe and the sample. For different purposes and different results, it may be useful to actuate the sample or the tip or some combination of both. Sensors are also commonly used in SPMs and AFMs. They are used to detect movement, position, or other attributes of various components of the SPM or AFM, including movement created by actuators.

For the purposes of this specification, unless otherwise indicated, the term "actuator" refers to a broad array of devices that convert input signals into physical motion that includes photothermal actuation, one of the main topics of this specification, along with piezo activated flexures; piezo tubes; piezo stacks, blocks, bimorphs and unimorphs; linear motors; electrostrictive actuators; electrostatic motors; capacitive motors; voice coil actuators; and magnetostrictive actuators; and the term "sensor" or "position sensor" refers to a device that converts a physical quantity such as displacement, velocity or acceleration into one or more signals such as an electrical signal, including interferometers (such as those described in U.S. Pat. No. 10,705,114 and family members), optical deflection detectors (including those referred to above as a PSD and those described in U.S. Pat. No. 6,612,160, Apparatus and Method for Isolating and Measuring Movement in Metrology Apparatus); capacitive sensors; inductive sensors (including eddy current sensors); differential transformers (such as those described in U.S. Pat. No. 7,038,443 and continuations thereof, Linear Variable Differential Transformers for High Precision Position Measurements; U.S. Pat. No. 8,269,485 and continuations thereof, Linear Variable Differential Transformer with Digital Electronics; and U.S. Pat. No. 8,502,525, and continuations thereof, Integrated Micro-Actuator and Linear Variable Differential Transformers for High Precision Position Measurements, each of which is hereby incorporated by reference in their entirety); variable reluctance; optical interferometry; strain gages; piezo sensors; and magnetostrictive and electrostrictive sensors.

In addition to being used to measure the deflection or oscillation of the probe, the light beam of an optical beam positioning unit can be used to photothermally excite mechanical vibrations of the probe. For this purpose light at the blue end of the visible spectrum is preferred. The inventors have used the beam from lasers emitting light with wavelengths of 405 nm and 637 nm respectively with satisfactory results.

In the prior art, a coating on some or all of the cantilever portion of the probe was required to convert heat from the light beam into mechanical strain in the probe, via different thermal expansion coefficients of the coated portion of the cantilever and the remainder of the probe. While the current invention is compatible with such coated cantilevers, it does not require a coating to photothermally induce mechanical vibrations of the probe. Due to the well-corrected optical design, the light beam focus in the present invention is significantly smaller than in the prior art. The smaller light beam focus produces stronger thermal gradients that cause photothermal excitation even in probes fabricated from a single material.

Because the material of the probe has nonzero thermal expansion, the thermal gradients produce strain gradients, especially when the light beam power is modulated to produce time-varying temperature gradients. For example, the light beam power can be changed sinusoidally as a function of time, producing a sinusoidal mechanical motion as required for amplitude-modulated atomic force microscopy. As described in prior art, such mechanical motion or vibration may also be enhanced by differences in thermal coefficients of expansion of two or more materials composing the probe in the case of heterogeneous probes.

Photothermal excitation of the probe may also be used in conjunction with other methods to form hybrid modes of cantilever excitation. For example, the cantilever may be driven by piezoacoustic excitation at a first resonance while simultaneously driven by photothermal excitation at a second resonance. This combination is useful if a large amplitude of oscillation, achievable with piezoacoustic excitation, is necessary for a first resonance, while the clean response of photothermal excitation is preferable for driving a second resonance. Alternative schemes for excitation may be developed to meet specific experimental goals. For example, photothermal excitation could be used to excite mechanical motion at a resonance of the cantilever while piezoacoustic excitation is used to drive the cantilever at a frequency that is not close to a cantilever resonance. Some of these schemes of excitation may involve frequency modulation or frequency tracking, in order to measure mechanical parameters of the sample, the probe or the tip of the probe. In this case, photothermal excitation is known in the prior art to provide an advantage because it provides a transfer function from excitation voltage to mechanical motion that is substantially independent of frequency and free from spurious resonances.

The location of the focused light beam on the probe used for photothermal excitation affects the drive amplitude of the probe. The relationship between location and drive amplitude is also frequency dependent because the probe has a frequency response composed of many normal and torsional eigenmodes.

There are locations that provide zero excitation of the second eigenmode, while providing non-zero excitation of the first eigenmode, for example. Depending on the experiment, it may be desirable to tune the drive amplitude of the probe at various frequencies. This may be achieved by modulating the power of the photothermal excitation light beam at particular frequencies, that may correspond to different eigenmodes of the probe, while rastering the focused spot relative to the probe and measuring the driven amplitude. It may be desirable, for example, to maximize the torsional (or normal) vibration response of the probe, while minimizing the response of the normal (or torsional) deflection of the probe in certain experiments.

Some current SPM/AFMs can take images that are on the order of 100 μm on a side, but are often smaller. Conventional AFM images require from four to ten minutes to acquire. Efforts are currently being made to move toward what has been called "video rate" imaging. Typically, those who use this term include producing image at the rate of one per second all the way to a true video rate at the rate of 30 per second. Video rate imaging would enable imaging moving samples, imaging ephemeral events and simply completing imaging on a timelier basis. One important means for moving toward video rate imaging is to decrease the size of the probe, thereby achieving a higher resonant frequency while maintaining a lower spring constant. These small cantilevers are typically quite difficult to actuate with non-photothermal methods.

The deflection detection laser position on the back of the cantilever can suffer lateral and vertical shifts with Z movement of optical detector and tip. The gage factor connecting the tip motion to the motion measured on the back of the cantilever depends on the spot position—both for OBD and interferometric detection schemes. It is therefore desirable to correct or account for any shifts in this position.

For proper operation of an atomic force microscope, the laser used for detection of the cantilever deflection must reflect off the cantilever. Typically, this position is close to the tip of the cantilever and centered on the long axis of the cantilever.

The sensitivity of the deflection measurement, which converts measured volts into nanometers of cantilever deflection, depends on location of the laser spot with respect to the cantilever. This is true for both OBD and for interferometric detection.

A typical scenario where this occurs is when the AFM user positions their laser 1 mm from the sample surface. To prepare for scanning we move the tip closer to the sample (typically 50-70 μm). This downward Z movement will cause the laser to be at a different position on the cantilever. The voltage output of the position detection system will necessarily be different.

One common problem encounter in AFM occurs when the cantilever is moved closer to the sample using a coarse positioning system, which may be manual or motorized. This typically occurs when the AFM user aligns the laser onto the cantilever when the cantilever is several millimeters above the sample and is subsequently required to bring the cantilever into proximity of the sample within 50 μm or so. During the coarse positioning, the alignment between the laser and the cantilever may change, and the laser position with respect to the cantilever may deviate substantially from the optimized or desired location. In some scenarios, especially for small levers, the laser misalignment might cause the laser to miss the cantilever and not reflect off the cantilever whatsoever.

DETAILED DESCRIPTION OF THE INVENTION

Coordinate Systems and Parameter Definitions

Figure 1:
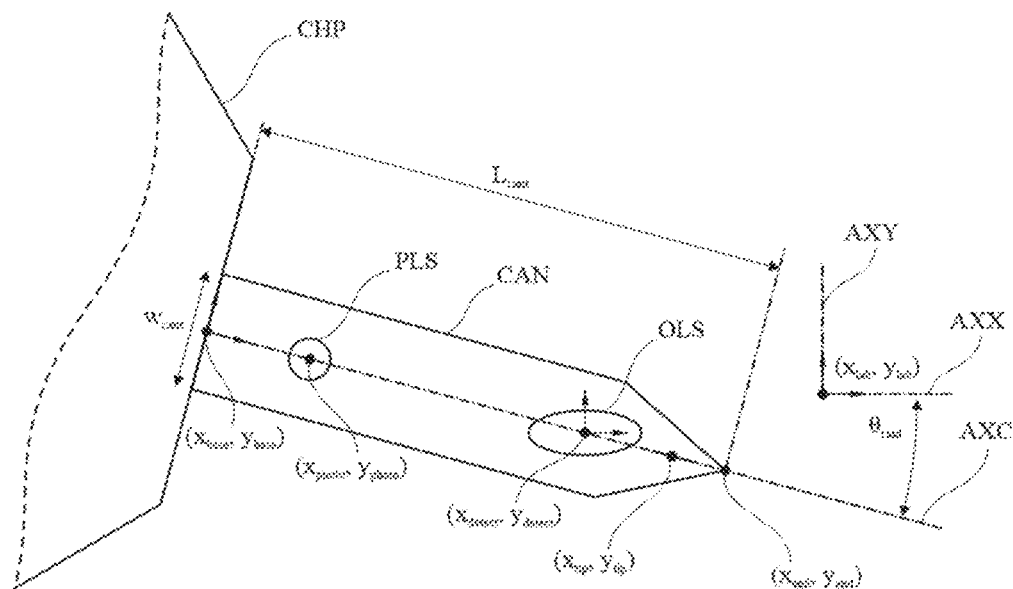
FIG. 1 shows a top and side view of a cantilever above a sample and both angles of the cantilever with respect to the lab frame.
Figure 1:
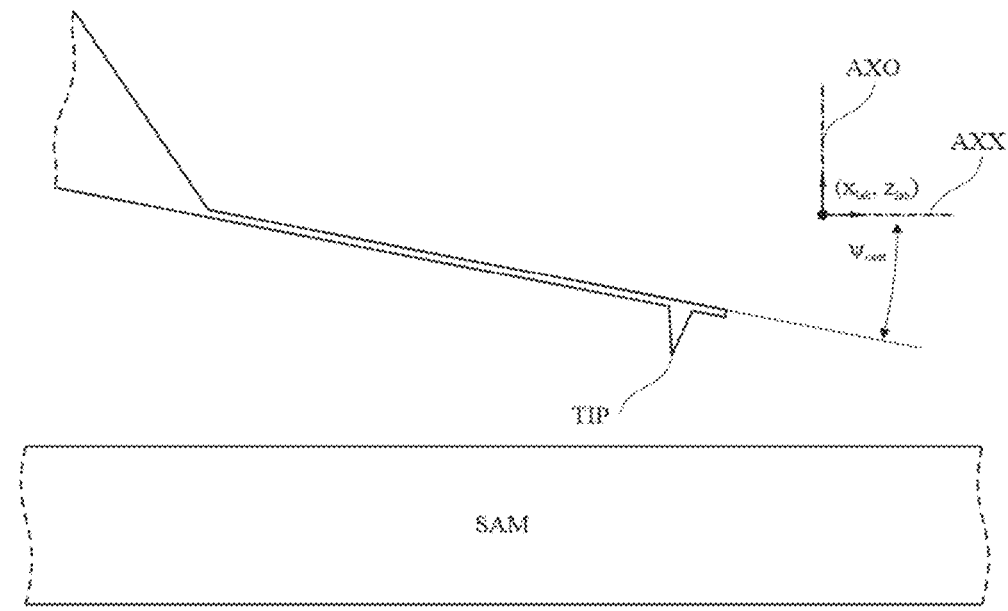

FIG. 1 shows a cantilever CAN attached to a cantilever chip CHP. The lab frame is defined by a vertical axis that is coincident with the optical axis AXO of the camera imaging system for viewing the cantilever from above. The x-axis AXX and y-axis AXY are both perpendicular to each other and the optical axis AXO.

The cantilever long axis AXC runs through the cantilever center; it is contained by the plane about which the cantilever is symmetric. The cantilever long axis AXC is deliberately tilted by $\psi_{cant}$ with respect to the AXL about the y-axis AXY.

This is a feature of the AFM design required for the cantilever to clear the sample SAM that is to be in contact with only the cantilever tip TIP. On the other hand, the cantilever long axis AXC is undesirably rotated by some angle $\theta_{cant}$ with respect to the x-axis AXX within the plane of the cantilever due to errors in the mechanical design and user errors in aligning the cantilever.

The lab frame coordinate system origin is typically defined by the AFM mechanical assembly, which has some origin ($x_{lab}$, $y_{lab}$) The position and orientation of the cantilever can be summarized by the location of its base ($x_{base}$, $y_{base}$) and of its free end ($x_{end}$, $y_{end}$).

The coordinate points that define the base and end of the cantilever are related to the length parameter of the cantilever by $$L_{cant} = \sqrt{(x_{end}-x_{base})^2+(y_{end}-y_{base})^2}$$

and the angle parameter of its axis $$\theta_{cant} = \mathrm{atan}\left(\frac{y_{end} - y_{base}}{x_{end} - x_{base}}\right)$$

with respect to the lab frame coordinate system. The cantilever width $w_{cant}$ is another parameter that describes the cantilever geometry, also shown for this particular geometry.

The lab frame described so far may be fixed with respect to the mechanical assembly of the AFM. However, in certain designs, it may be mathematically more convenient to tether the lab frame coordinate system to the camera view itself. Specifically, for AFMs where the imaging lens moves with respect to the camera sensor, it is more convenient to tether the lab frame coordinate system to the front focal point of the imaging objective, or imaging lens. In that case, the field of view moves with the objective rather than the camera, as described in detail in US20100275334A1. In other designs, it may be most convenient to assign the light spot location as the lab frame coordinate origin; in other designs it might be best to assign the cantilever end location as the lab frame coordinate origin. Depending on the AFM design, there exists some lab frame coordinate system that is most convenient. Whereas choosing the simplest coordinate system simplifies the mathematics of the presented invention, it does not affect the concepts described by the actual invention.

In FIG. 1, the position of the light spot used for detecting the movement of the cantilever is defined by ($x_{detect}$, $y_{detect}$). On the other hand, the position of the light spot used for photothermal excitation of the cantilever is defined by ($x_{photo}$, $y_{photo}$). This additional photothermal light spot is not a requirement for AFM operation and will only be referred to in a subset of the descriptions of the invention.

Some AFMs use a plurality of light detection spots. Such additional light spots are not shown in FIG. 1 for simplicity, but will be referred to in the description of the invention in analogy to the depicted light spot. For example, an additional light spot is used in a commercial AFM that simultaneously uses both optical beam deflection methods and interferometric methods of detecting cantilever movement and is described in U.S. patent Ser. No. 10/338,096 and 10/705,114.

The plurality of focused light spots on or near the cantilever may be moved together with respect to the lab frame, or moved independently from one another, depending on the arrangement of their optical beam position units (OBPU), such as described in U.S. Pat. No. 9,383,386. This prior art also describes the benefits of deliberately tilting the OBPU's mechanical coordinate system of a light spot positioning system with respect to the lab frame coordinate system.

However, the mechanical axes defining the coordinate systems of the OBPUs presented here are assumed parallel and/or perpendicular to the lab frame, for simplicity and with no loss of generality. Whether the light spots are moved with a single actuator, or several actuators, a position of each light spot in the lab frame coordinate system may be described with the two axes coordinate system described so far. In other words, an actuator may move a single coordinate system with respect to others, or multiple coordinate systems with respect to others.

Rough Initial Positioning

In order to acquire any meaningful AFM observables, a substantial portion of the detection light spot must reflect off the cantilever and reach the photodetector. To achieve this condition, very rough positioning of the detection light spot onto the cantilever is required. This requires at least an approximate location of both the light spot and the cantilever with respect to the lab frame coordinate system.

Similarly, for rough positioning of the photothermal light spot, a substantial portion of the photothermal light spot must impinge on the cantilever, preferably while the detection light spot is also reflecting off the cantilever and reaching the photodetector.

Appropriate calibration of the light spot optomechanics allows the position of any light spots in the field of view of the camera to be predetermined before the experiment begins. This may be achieved by setting the characteristics of the light source, such as light beam location and angle, at some time during assembly of the instrument and storing the resulting the light spot location in memory for later use, as described in detail in US20100275334A1. Alternatively, a position sensitive photodiode internal to the OBPU may be used to calibrate the light spot position every time the instrument is powered up, as described in detail in U.S. Pat. No. 9,383,386.

The location of the cantilever may be identified by the user or a vision system by inspection of the field of view of the camera. This may require movement of the cantilever in the field of view of the camera in all three directions to track down the position of the cantilever and setting it into focus. Furthermore, the illumination of the cantilever may be tuned to obtain a camera view that is neither overexposed nor underexposed. The position of the cantilever may be determined by executing a procedure that moves the cantilever with respect to the lab frame in all three directions while performing image analysis of the camera view, with the ultimate goal of recognizing the cantilever in the field of view and of achieving a sharp image of the cantilever end.

A priori knowledge of the cantilever shape and size that is either stored in the AFM software or entered by the AFM user may aid in the identification of the cantilever through the camera view. There are many approaches to this known in the art including image cross-correlation and principal component analysis. This information can be stored in machine-readable formats such as bar graphs and QR codes and/or relayed electronically between a database and the end user.

A small aperture that increases the depth of field may be beneficial for finding the cantilever within the three-dimensional field of view. However, a more precise position of the cantilever end and/or base location may be achieved by using a large aperture that limits the field of view and increases optical resolution.

Limiting the depth of field may be especially beneficial when performing image analysis and attempting to isolate the cantilever image from its background since a large aperture may blur the background while maintaining a sharp image of the cantilever.

Performing a high-pass operation on an image of a cantilever can be highly effective in identifying the outline of the cantilever without confusing any of its features with background features. Using a highly opened aperture in combination of a high-pass filter can provide even more robust discrimination of the cantilever features with respect to the background features.

With knowledge of the cantilever position and the light spot position, the two can be at least partially superimposed to achieve a substantial reflection of optical power from the cantilever. The superimposition may be achieved by moving the light spot, moving the cantilever, or some combination thereof. The alignment may be confirmed by measuring a non-negligible (pre-determined minimum) amount of light power at the photodetector. Alignment of the photodetector may be required to provide an accurate measure of light power reflecting off the cantilever, as known to those skilled in the art.

Alternatively, in lieu of analyzing a camera image of the cantilever, the observables detected by the AFM electronics may solely be used to ensure partial superposition of the light spot onto the cantilever. These AFM observables include, but are not limited to, the cantilever deflection, the oscillation amplitude of the cantilever and total power at the photodetector (henceforth referred to as the "sum"). Any AFM observable may be used to determine that the light spot is reflecting off the cantilever. It may be required to raster scan the light spot with respect to the cantilever in two or three dimensions to bring the light spot within the proximity of the cantilever in order to reflect a substantial amount of light off the cantilever.

Determining Cantilever Coordinates

Whereas the light spot for cantilever bending detection is typically positioned near the end of the cantilever during AFM operation, the light spot for photothermal excitation is typically positioned near the base for optimal performance. In most AFM designs, the cantilever is tilted by $\psi_{cant}$ with respect to the optical focal plane of the imaging system. Due to the finite depth of field of the optical imaging system, the base of the cantilever may be blurry while the end of the cantilever is in focus. In that case, determining the base coordinate of the cantilever may be difficult and inaccurate. One method is to use the known length of the cantilever and the measured angle of the cantilever $\theta_{cant}$ to calculate the cantilever base coordinate. Alternatively, the camera focus may be moved along the optical axis AXO of the imaging system to provide a sharp focus of the cantilever base. The optically determined base location of the cantilever can then be stored, and the focus may be returned to the cantilever tip, as is typically desirable.

Focus stacking of several images of the cantilever can also be performed to obtain an image of the cantilever that is substantially sharp from its base to its tip to aid image analysis and the extraction of the cantilever coordinates and relevant cantilever parameters.

Figure 2:
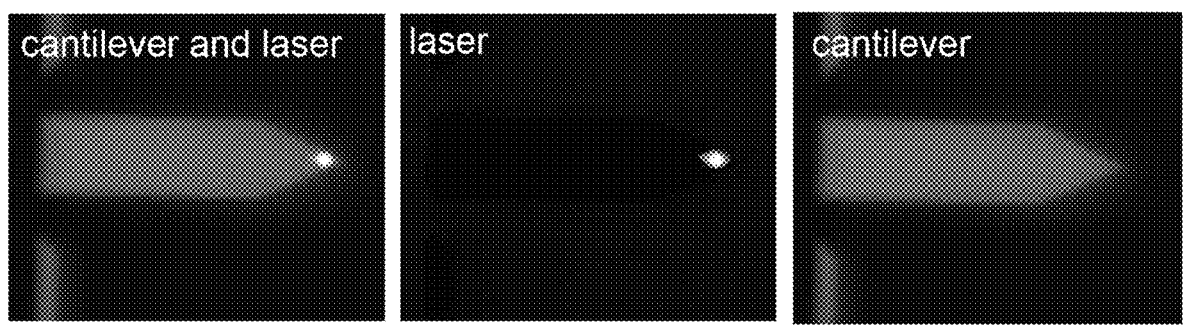
FIG. 2 shows a camera image of the cantilever with permutations of the illumination and detection light turned on and off.

In certain cases, the exposure of any of the light spots may not be matched to the exposure of the cantilever, such that any of the light spots or the cantilever may appear very dark or very bright in the camera view. To avoid any confusion between features of the cantilever and features of any of the light spots, it may be beneficial to perform image analysis of all features separately. For example, the illumination light for the cantilever may be turned off in order to determine more accurately the light spot location from the camera image, as shown in FIG. 2. Alternatively, the light spot sources may be turned off, and the illumination light may be turned on to provide a clear unobstructed view of the cantilever; also shown in FIG. 2. These images and analyzed positions of the cantilever and light spots may be stored for future use. At some point in the future, the same image analysis procedure may be repeated and the results may be compared to stored values to determine the positioning errors. At that point, the relative difference between the new light spot location and the new cantilever location may be used to restore some relative position between both deemed optimal at a previous time.

The goal to separate the features observed from the light spots and the cantilever in the camera image described so far may be alternatively achieved by splitting the camera image into its color channels. By splitting the color image into RGB or CMYK channels, the features of the cantilever and light spots may appear predominantly in one channel with respect to others. The advantage of this approach is that the speed of the image analysis routine may be improved.

Furthermore, it may be undesirable to turn light sources on and off due to the finite thermal settling times of the light sources that might result in drift of AFM observables.

Because turning light spots off and then on again might be detrimental in the short-term for AFM stability, it may be desirable to avoid this strategy.

Alternatively, the light that illuminates the cantilever for optical imaging may have its intensity increased temporarily, combined with a decrease in exposure time or sensitivity of the camera. This effectively results in maintaining a well exposed cantilever required for optical image analysis, while substantially dimming the brightness of the light spots as seen by the camera image. Especially when combined with color channel splitting described above, this method allows to separate the light spot features from the cantilever features for more effective image analysis of the cantilever geometry.

With a camera image of the cantilever, image analysis can be used to determine the angle of the cantilever axis angle $\theta_{cant}$. Most commercial AFM cantilevers exhibit bilateral symmetry, for which methods such as principal component analysis (PCA). Rotationally sensitive cross-correlation techniques and other image processing tools that use a library image of a reference image and the user loaded lever (new cantilever) should also return the angle $\theta_{cant}$. Even some cantilevers that are asymmetric typically appear symmetric when observed through the AFM camera system, since the asymmetry lies in the presence or absence of a tip on either side of the cantilever which may not be observed by the camera image.

Alternatively to using image analysis methods, the cantilever axis angle $\theta_{cant}$ may be determined by actuating the light spot motors and measuring the resulting AFM observables. For example, translating the light spot across the cantilever along the y-axis of the lab frame results in a measure of the sum signal that can be used to determine the cantilever center $y_{center,1}$ for that specific $x_{detect,1}$ location. The cantilever center may be determined as the sum signal weighted center or calculated by averaging the location of edges detected by finding maxima of the derivative of the sum signal. By performing an identical routine at a different location along the x-axis of the lab frame $x_{detect,2}$, an additional measure of the cantilever center $y_{center,2}$ can be used to determine the cantilever axis angle by $$\theta_{cant} = \operatorname{atan}\left(\frac{y_{center,2} - y_{center,1}}{x_{detect,2} - x_{detect,1}}\right)$$

The distance between both x locations should be maximized to ensure accurate and precise angle measurement, while ensuring that the detection light spot is within the bounds of the cantilever length: $x_{base} < x_{detect} < x_{end}$.

Optimal Positioning

The position of the detection light spot $(x_{detect}, y_{detect})$ with respect to the cantilever may be optimized using a variety of methods to achieve a particular goal. A typical goal is to maximize the AFM sensitivity while minimizing loss of optical power reflected off the cantilever. This optimization usually occurs when the detection light spot location is as close to the cantilever end as possible without spilling over the edge, as is well known to those skilled in the art.

In the simplest implementation, the AFM observables are recorded with respect to motions of individual actuators, such when translating a light spot along the x-axis or the y-axis in the lab frame. This scenario works optimally when the cantilever is positioned with its long axis parallel to one of axes of the lab frame.

However, information about the cantilever axis deviating from $\theta_{cant} = 0°$ may be used to move the laser spot along the cantilever axis by appropriately moving two actuators simultaneously with a prescribed ratio that results in a light spot motion that is parallel to the cantilever long axis AXL as seen in the projected view of the camera image.

In some cases, it may be desirable to optimize positions for one or more different imaging modes of the AFM or other functions such as cleaning of the cantilever tip or material ablation of the sample, for example. The positions and other settings for these different operations could be optimized each time or, alternatively, optimized and then stored for later retrieval and redeployment.

The position of the light spot on the cantilever may be optimized using feature recognition of images of the cantilever taken with the optical system, and prior knowledge of the cantilever shape and its associated optimal positions of different light spots. For a given cantilever model and application, the optimal location of the light spots can be recorded in the software. Once the coordinates of the light spot and the cantilever are determined, then the alignment between the two that is deemed optimal may be executed. A separate criterion of optimality may be recorded for each light spot separately.

The optimization criteria for the light spot position may be stored in the software and related to the cantilever coordinates. For example, the location of the photothermal light spot might be deemed optimal when it is 10% of the length of the cantilever $L_{cant}$ to the right of the base coordinate along the cantilever axis AXC. For another cantilever, the optical location might be substantially away from cantilever axis AXC to one side of the cantilever or another. See FIG. 3 for a specific example where the optimal photothermal location is substantially away from AXC for efficiently driving the $1^{st}$ eigen-mode.

Different cantilevers will have different optimization criteria that may be stored in the software for future use. These optimization criteria may be stored as absolute distances and directions from the cantilever coordinates based on the cantilever model and the specific application. Alternatively, the distances may be stored as relative distances that are normalized by the cantilever length, width, or some combination thereof. The appropriate normalization depends on the specific cantilever geometry and application.

When a substantial portion of the light power reflects off the cantilever, AFM observables may be used as the information necessary to optimize the location of the cantilever for a given application. In this case, the optimization criteria for the light spot position may be based on metrics derived from AFM observables.

For example, the location of the light spot that achieves the largest oscillation amplitude may be deemed optimal, regardless of the light spot position with respect to the cantilever coordinates. This optimal position may be achieved by moving several actuators simultaneously or successively while analyzing AFM observables with respect to some optimization criterion or optimization criteria.

For example, it may advantageous to move the detection spot actuators along both the x- and y-axes simultaneously.

Figure 3:
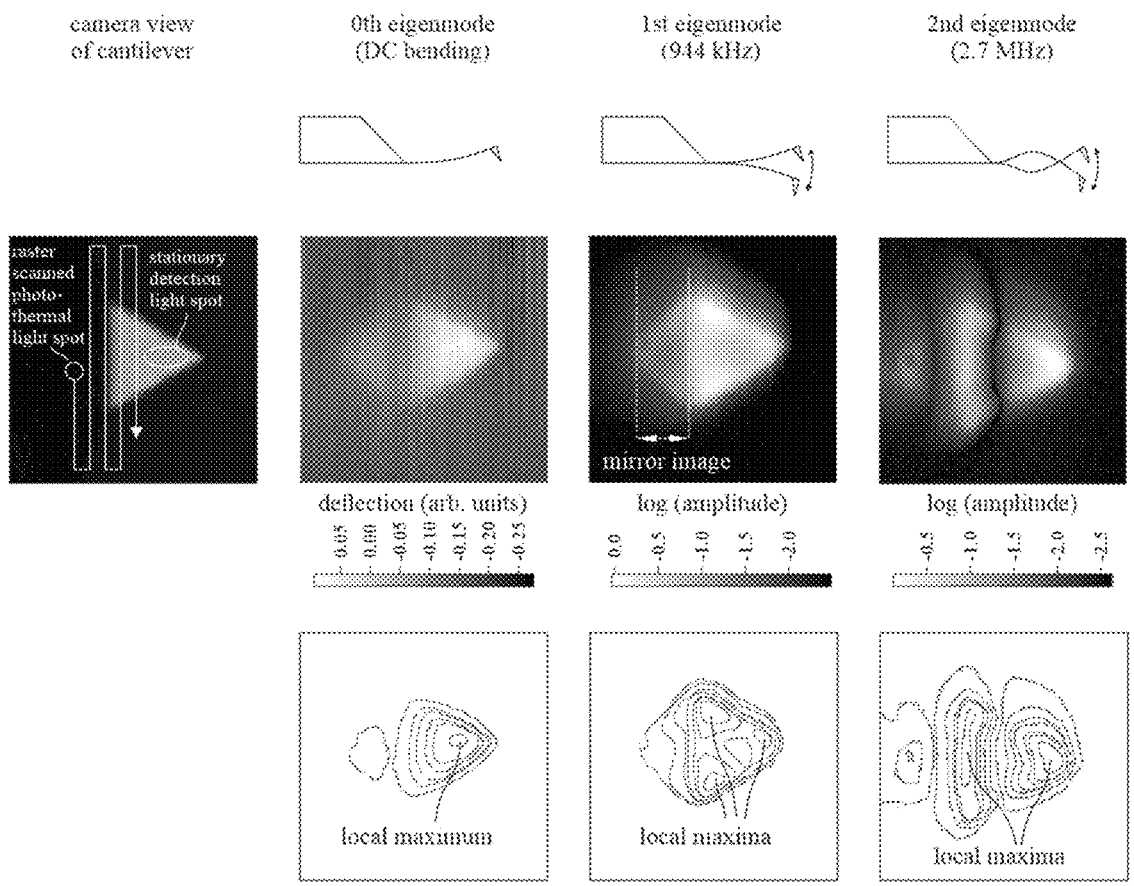
FIG. 3 shows a camera view and plots of a cantilever that is photothermally actuated in different modes.

In the case of positioning the light spot for photothermal excitation, the optimal location of the spot depends on the mode shape (related to the eigenmodes of the cantilever) that is being excited. Typically, the first eigenmode has a single local maximum for the light spot position along the cantilever axis AXC that maximizes the drive amplitude of the cantilever. Some cantilevers may have a plurality of local maxima on the cantilever, some of which may be substantially distanced from the cantilever AXC, as shown in FIG. 3. Furthermore, photothermal light reflecting off the cantilever chip can also be absorbed by the cantilever; this creates a mirror image of all the photothermal excitation maxima that may be beneficial for certain scenarios. Due to the complexity of the light spot positions of the local maxima for photothermal excitation, a single procedure for optimizing the light spot position may not be robust across all cantilever models. It may be beneficial to store information about the cantilever models and the associated optimization parameters for most effective photothermal excitation.

For a single eigenmode, such as the first eigenmode described above, the advantage of operating at a local maximum for photothermal excitation is two-fold: the amplitude of excitation is maximized, the effects of light spot position error, such as drift, has minimal effect on the amplitude of excitation. This results in the most stable imaging conditions. However, when using a single light spot for photothermal excitation of a plurality of eigenmodes, a single position of the light spot will not necessarily coincide with a maximum for all the excited eigenmodes simultaneously. In that case, some compromise in the light spot location between local maxima of the plurality of modes may be deemed optimal for the simultaneous drive of these eigenmodes.

So far, the first eigenmode and higher eigenmodes have been described in the context of photothermal excitation. However, for the purpose of positioning the photothermal light spot on the cantilever, the $0^{th}$ eigenmode may also be considered in the overall optimization procedure. The $0^{th}$ eigenmode refers to the bending of the cantilever that is substantially below the first resonance frequency and may not be modulated by a specific driving frequency, as depicted in FIG. 3.

In the case where the bending of the cantilever is desirable and used deliberately track features of the sample, a maximum of the $0^{th}$ eigenmode may be deemed optimal. In other situations, where the bending of the cantilever is considered a nuisance that results in drift between the tip and the sample, it may be beneficial to position the light spot in order to reduce the bending of the cantilever. There may be some compromise between a low response of the $0^{th}$ eigenmode and a high response of the $1^{st}$ eigenmode that is deemed optimal for a specific cantilever and imaging mode combination.

A camera view of a cantilever (ArrowUHFAuD) is shown by FIG. 3. While the detection light spot is stationary near the cantilever end, the photothermal light spot is raster scanned across the field of view of the cantilever. By modulating the photothermal light source at the $1^{st}$ and $2^{nd}$ eigenmode frequencies, a map of the $0^{th}$ eigenmode (DC bending), $1^{st}$ and $2^{nd}$ eigenmodes are acquired. Note that the response seen by shining on the cantilever chip is a result of the light reflecting off the cantilever chip onto the cantilever (a mirror image). The plots in FIG. 3 are contour plots of the eigenmode responses that clearly identify the local maxima for excitation of all three modes.

Figure 4:
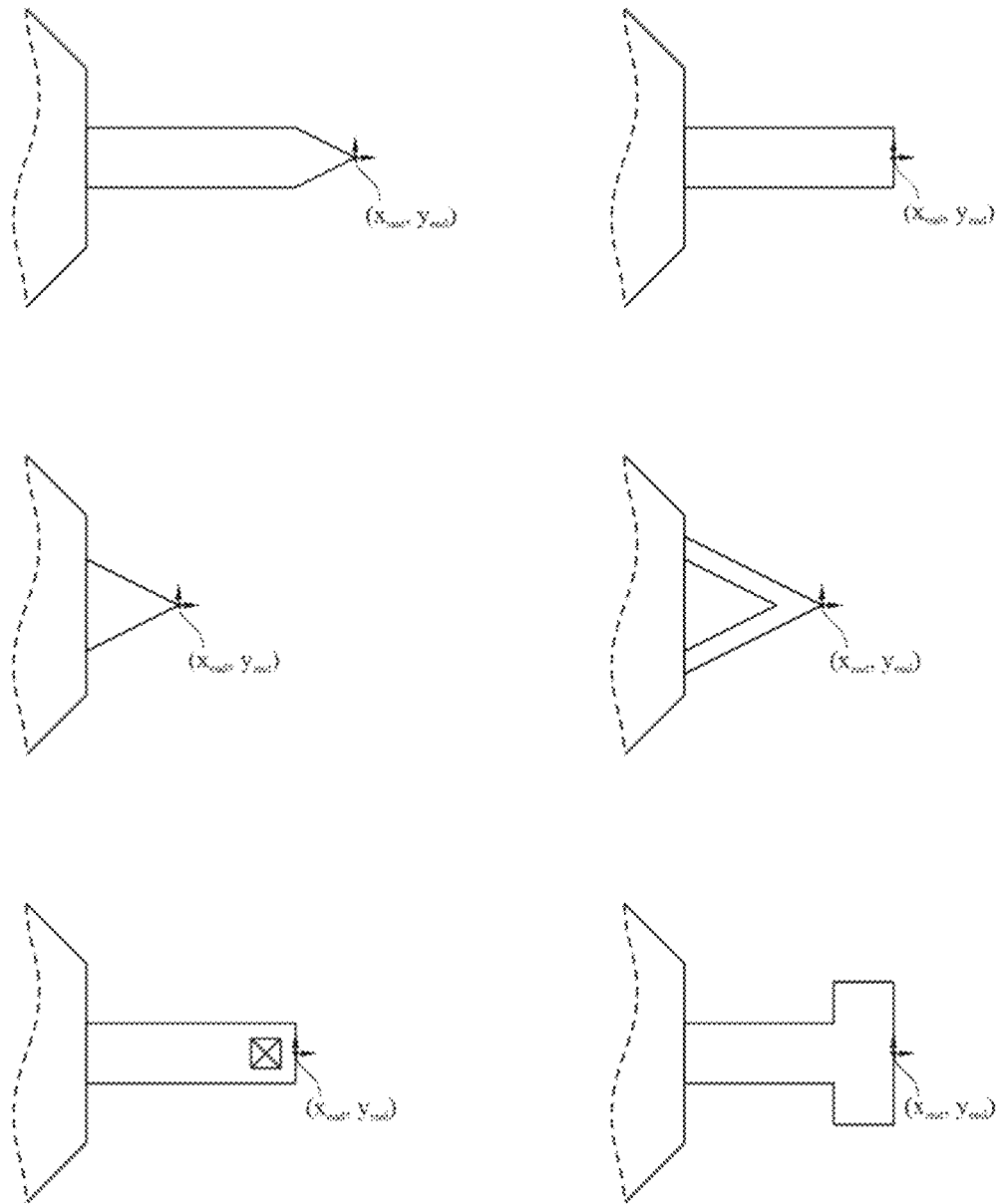
FIG. 4 shows various potential cantilever shapes.

Whereas the inventions described so far were described in the context of a cantilever as shown in FIG. 1, there are cantilever with shapes substantially different. In FIG. 4, a non-exhaustive variety of cantilever geometries is shown.

The coordinates that determine the cantilever orientation and size require new geometric definitions with respect to the first cantilever definition. In fact, for proper operation of the inventions described so far, the type of cantilever will require identification either by user-defined input, by deduction made from AFM observables, or the recognition through the camera view, or some combination thereof.

Figure 5:
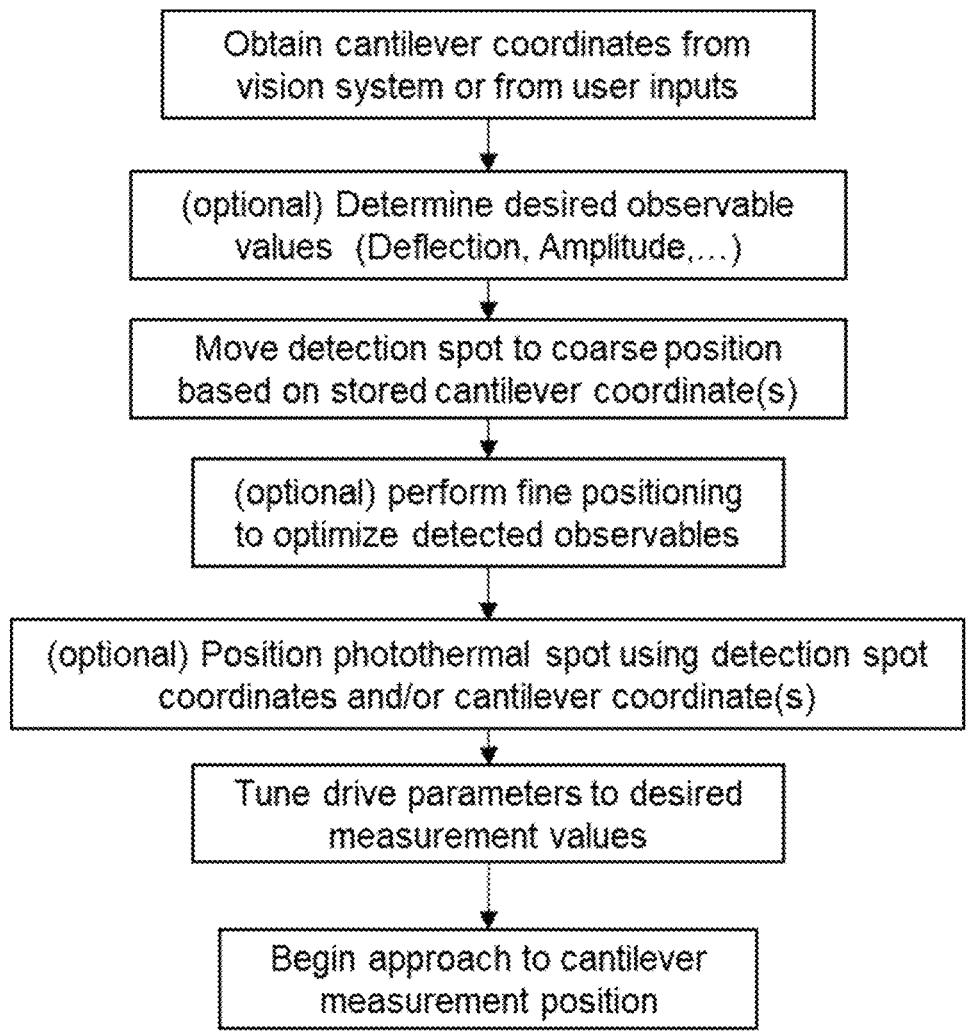
FIG. 5 shows an exemplary method for obtaining positional parameters relating to an initial positioning of a light spot on the surface of the cantilever.

FIG. 5 provides an exemplary method for finding a target position (also referred to herein as a "set position") for a light spot on the surface of the cantilever, which may correspond to the optimal position as described above. Once identified, the one or more positional parameters relating to the output from one or both of the camera and the photodetector are stored in memory. Movement of the cantilever relative to the sample during normal operation of the AFM may induce unwanted movement of light spot away from the target position. It is an object of the invention to correct for this stray movement and return the light spot to the target position, as will now be described.

Tracking Cantilever Focus and Light Spot Position

During operation of the AFM, coarse positioning of the cantilever with respect to the sample can cause a discrepancy between the true location of the cantilever or any of the light spots with respect to the lab frame in all three dimensions.

Thermal drift of the AFM, and motor backlash may also cause similar discrepancies. In some instances, the encoders that measure the positions of the actuators may appropriately recognize the undesired motion and correct it appropriately; however, in other instances that depend on the mechanical details of the assembly, the encoders may be insensitive to the undesired motion. To correct for undesired motion, tracking of errors in light spot and cantilever positioning independently may be desirable. Note that the positioning discrepancies may occur in any combination of all three axes of motion.

The optimal light spot position with respect to the cantilever may be recorded by acquiring and storing a still frame of the camera view that images the cantilever.

It may be desirable to store various images by combining any of the methods discussed above, such as color channel splitting, exposure control of the light spot with respect to the cantilever, or turning on and off the light spot sources and cantilever illumination in some sequence.

At any point in time after the light spot position and the cantilever coordinates have accumulated errors in their relative position, the actuators that move the cantilever or any of the light spots in three dimensions may be actuated repeatedly in order to reduce any differences between the current camera image and the stored image that was deemed optimal. Although the order in which these actuators are used for realignment is not necessarily prescribed, it may be beneficial to correct for the focus of the cantilever first. This is achieved by correcting for errors along the optical axis AXO. Subsequently, the relative positions between the light spot and the cantilever along the x-axis AXX and the y-axis AXY can be corrected. Furthermore, it may be beneficial to align the current cantilever position with respect to a stored cantilever position prior to realigning the light spots with respect to the cantilever. This is especially beneficial in an AFM design where the cantilever accumulates positioning discrepancies with respect to the lab frame while the discrepancies between the light spots and the lab frame remain negligible.

At any point in time after the light spot position and the cantilever coordinates have accumulated errors in their relative position, a routine for reassigning some light spot position deemed optimal may be required. This can be achieved by 1) refocusing cantilever, 2) centering spot across the width of the cantilever, 3) reoptimizing position along cantilever. Whereas the first step may preferentially use the camera view for focus optimization, the latter two steps can be achieved quickly by use of the AFM observables that are relevant to the particular cantilever and imaging mode under optimization.

When measuring the AFM observables while scanning the light spot along the cantilever long axis, and perpendicular to the cantilever long axis (or simply along the x-axis of the lab frame or the y-axis of the lab frame), there may be noise and variations that create several local maxima in the AFM observables.

This may lead to ambiguity in the data analysis and erroneous determination of the light spot position with respect to the cantilever position. Therefore, it may be beneficial to smoothen the data of acquired AFM observables with respect to motion coordinates in between certain steps in the position optimization.

The optimization routines described so far have relied on moving the light spots relative to a stationary cantilever. However, another implementation of an AFM may require the movement of the cantilever while the light spots remain stationary in the lab frame.

Figure 6:
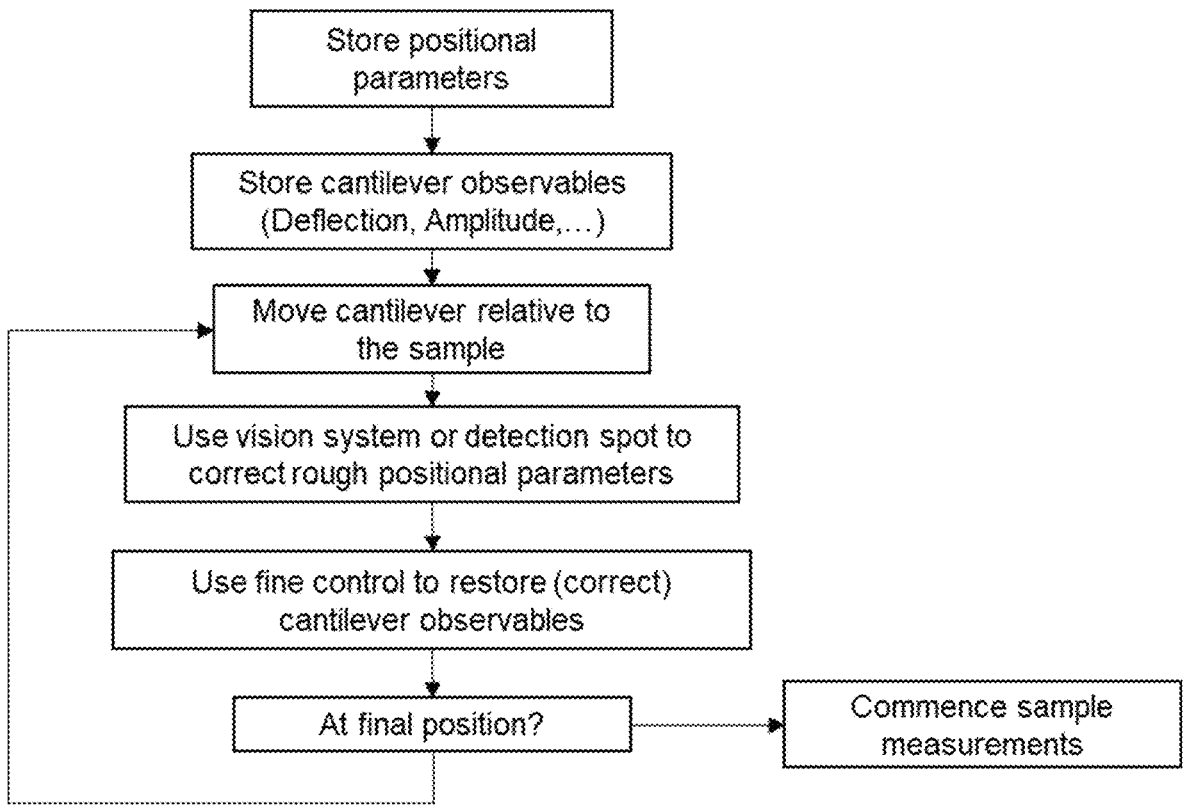
FIG. 6 shows an exemplary method for correcting for a change in the position of a light spot on the surface of the cantilever in response to movement of the cantilever relative to the sample.

An exemplary iterative process for correcting for unwanted motion of a light spot on the surface of the cantilever is shown by FIG. 6.

The invention claimed is:

1. An atomic force microscope, comprising:
a probe having a cantilever with a tip;
a sample holder configured to position a sample that can be measured with the tip of the cantilever;
an actuator assembly configured to move the cantilever relative to the sample holder;
a first light source arranged to emit a first beam of light having a first wavelength onto a surface of the cantilever, the first beam forming a first spot on the surface of the cantilever;
an optical assembly configured to adjust the position of the first spot on the surface of the cantilever;
a sensor assembly comprising a photodetector and a camera, the photodetector for monitoring light of the first wavelength that is reflected from the surface of the cantilever and measuring deflections of the cantilever from the monitored light of the first wavelength, and the camera for acquiring an image of the surface of the cantilever, wherein the sensor assembly is configured to output one or more positional parameters indicative of the position of the first spot on the surface of the cantilever;
a controller configured to store the one or more positional parameters output by the sensor assembly when the first spot is located at a first preset position on the surface of the cantilever, the controller further configured to operate the actuator assembly so as to induce movement of the first spot away from the first preset position, the controller further configured to detect said movement of the first spot based on a change in the one or more positional parameters output by the sensor assembly, and to operate the optical assembly in response to the detected movement of the first spot to return the first spot to the first preset position.

2. An atomic force microscope according to claim 1, wherein the one or more positional parameters output by the sensor assembly include a parameter based on the position of the first spot in an image acquired by the camera.

3. An atomic force microscope according to claim 1, wherein the one or more positional parameters are based on a user input and coordinates of the cantilever based on a camera image.

4. An atomic force microscope according to claim 1, wherein the one or more positional parameters output by the sensor assembly include a parameter based on an output from the photodetector.

5. An atomic force microscope according to claim 4, wherein the one or more positional parameters output by the sensor assembly include a parameter relating to motion of the cantilever.

6. An atomic force microscope according to claim 4, wherein the one or more positional parameters output by the sensor assembly include any of: a cantilever deflection, an amplitude of cantilever oscillation, a phase of oscillation, a resonant frequency for the probe, a quality factor, a noise floor and a signal to noise level.

7. An atomic force microscope according to claim 1, further comprising:
a second light source arranged to emit a second beam of light having a second wavelength onto a surface of the cantilever, the second beam forming a second spot on the surface of the cantilever, the second spot for inducing photothermal motion of the cantilever.

8. An atomic force microscope according to claim 7, wherein the optical assembly is further configured to adjust the position of the second spot on the surface of the cantilever;
wherein the sensor assembly is configured to output one or more positional parameters indicative of the position of the second spot on the surface of the cantilever; and
wherein the controller is configured to store the one or more positional parameters output by the sensor assembly when the second spot is located at a second preset position on the surface of the cantilever, the controller further configured to operate the actuator assembly so as to induce movement of the second spot away from the second preset position, the controller further configured to detect said movement of the second spot based on a change in the one or more positional parameters output by the sensor assembly, and to operate the optical assembly in response to the detected movement of the second spot to return the second spot to the second preset position.

9. An atomic force microscope according to claim 8, wherein the one or more positional parameters output by the sensor assembly include a parameter based on the position of the second spot in an image acquired by the camera.

10. A method for operating an atomic force microscope, the atomic force microscope comprising:
   a probe having a cantilever with a tip;
   a sample holder configured to position a sample that can be measured with the tip of the cantilever;
   a first light source arranged to emit a first beam of light having a first wavelength onto a surface of the cantilever, the first beam forming a first spot on the surface of the cantilever;
   an optical assembly configured to adjust the position of the first spot on the surface of the cantilever;
   a sensor assembly comprising a photodetector and a camera, the photodetector for monitoring light of the first wavelength that is reflected from the surface of the cantilever and measuring deflections of the cantilever from the monitored light of the first wavelength, and the camera for acquiring an image of the surface of the cantilever, wherein the sensor assembly is configured to output one or more positional parameters indicative of the position of the first spot on the surface of the cantilever;

the method comprising:
   (i) storing in memory one or more positional parameters output by the sensor assembly when the first spot is located at a first preset position on the surface of the cantilever;
   (ii) moving the cantilever relative to the sample holder so as to induce movement of the first spot away from the first preset position;
   (iii) detecting said movement of the first spot away from the first preset position based on a change in the one or more positional parameters output by the sensor assembly; and
   (iv) operating the optical assembly in response to the detected movement of the first spot to return the position of the first spot to the first preset position.

11. A method according to claim 10, wherein steps (iii) and (iv) are performed automatically by an electronic controller in response to the performance of step (ii).

12. A computer readable medium containing instructions which when executed by a computing system causes an atomic force microscope to perform the method of claim 10.

* * * * *